United States Patent

[11] 3,589,579

[72] Inventor Gordon Richard Schulz Tujunga, Calif.
[21] Appl. No. 823,073
[22] Filed May 8, 1969
[45] Patented June 29, 1971
[73] Assignee Leach Corporation Pasadena, Calif.

[54] BIDIRECTIONAL RANDOM BIN TAPE DRIVE SYSTEM
9 Claims, 2 Drawing Figs.

[52] U.S. Cl. 226/50, 226/195, 226/118
[51] Int. Cl. G11b 23/06
[50] Field of Search 226/49, 50, 195, 118; 179/100.2 Z

[56] References Cited

UNITED STATES PATENTS

| | | | |
|---|---|---|---|
| 2,943,852 | 7/1960 | Quirk | 226/50 |
| 3,411,684 | 11/1968 | Tison et al. | 226/195 X |

FOREIGN PATENTS

| | | | |
|---|---|---|---|
| 1,291,235 | 3/1962 | France | 226/118 |

*Primary Examiner*—Allen N. Knowles
*Attorney*—Jackson & Jones

ABSTRACT: A drive system for bidirectionally driving a tape of an endless loop random bin tape system is disclosed. The tape is driven across a transducer assembly by a pair of differential capstans. The storage bin has a pair of entrance and/or exit passages communicating with the transducer portion of the recording and reproducing system. At each entrance and/or exit location there is provided an endless belt drive puck pair which makes frictional contact with the magnetic tape. The endless belt drive puck pair always move in the direction tending to urge the tape into the bin irrespective of the actual direction of tape movement. Each pair provides the necessary tape-driving force to drive the tape into the bin in one direction and conversely they will, when the tape moves in an opposite direction, tend to reject spurious loops which are drawn to the bin exit passage.

INVENTOR.
GORDON RICHARD SCHULZ
BY Jackson + Jones
ATTORNEYS.

BIDIRECTIONAL RANDOM BIN TAPE DRIVE SYSTEM

BACKGROUND OF THE INVENTION

1. Field of the Invention

The present invention relates to tape data storage and retrieval systems and more particularly to a random bin tape system having a bidirectional drive capability.

2. Description of the Prior Art

Tape recorders employing an endless loop magnetic tape are known in the prior art. In the endless loop family the prominent types generally used are inside-out, roller-to-roller, and random bin.

In the existing art, all three types have heretofore been utilized to achieve one primary function; namely to record and/or reproduce data on a continual basis without reversal interruption. In this concept, information is reproduced in the same direction as recorded.

It is sometimes desirable, however, to not only record and reproduce in the same order or direction but to record in one direction and reproduce in an opposite direction. The purpose here is to record on a continual basis and, upon command, be able to reproduce at any desired moment. It is further desirable to achieve such operation without preconsideration as to the location of the end of tape, such as would be required in a reel-to-reel scheme.

The inside-out concept by its very nature is not susceptible of bidirectional operation. In a roller-to-roller system the endless tape is stored on a plurality of guide roller pairs. The roller-to-roller endless loop transport can achieve bidirectional operation. Due to the inherent high power requirements per lineal inch of tape, however, the roller-to-roller concept is unacceptable where long lengths of tape are required or where minimization of size, weight and power are of prime importance. In addition, the roller-to-roller scheme is inherently susceptible to environmental disturbances such as vibration, shock and temperature variation. The random bin technique, by virtue of its simplicity of concept, minimum size, weight and power requirements per lineal inch of tape, and relative isolation from environmental conditions provides an excellent solution for many system requirements.

The existing art of random bin endless loop transports has only a unidirectional capability. In the existing art, the tape is fed into the bin by a driven part to which the tape is clamped on its periphery by an endless belt or roller in such a manner as to cause the tape to be driven into the bin. The tape exits from the bin through the bin wall generally at some point farthest from the entrance. The tape exits through a slot or restrictive part that reduces the tape to a single layer required to control and handle the tape for recording and reproducing purposes.

This method is not suitable for tape movement in the reverse direction. The bin exit slot provides no means for driving the tape into the bin. The bin input drive puck provides no means for reducing the loops to a single layer necessary because the puck would have a tendency during reverse operation to draw in a group of random loops thus rendering the record and reproduce operation inoperable. For bidirectional tape operation it is necessary to provide each bin opening location with the capability of selectively operating in either a bin input or bin output mode depending upon the direction of tape movement.

SUMMARY OF THE INVENTION

In accordance with my invention, these and other problems have been solved. In order to achieve bidirectional operation, a drive puck is provided which always turns in the direction of urging the tape into the bin irrespective of the actual direction of tape movement. This provides the necessary tape-driving force to cause the tape to move into the bin in one direction and conversely the puck will, when the tape moves in an opposite direction, tend to reject spurious loops which are drawn to the bin exit point.

The tape is held in frictional contact with the puck by an endless belt whose contact surface is also driven in the direction tending to urge the tape into the bin irrespective of the actual direction of tape movement.

The belt and puck surfaces move at a slightly higher velocity than the tape to provide a tension on the tape when operating as the bin input feed drive.

There are two sets of endless belt drive puck pairs, one at each bin opening location. In both cases the belt and puck surfaces contacting the endless tape move in directions to cause the tape to have a tendency to move into the bin irrespective of the actual direction of tape movement. The tape is driven across a transducer assembly by a pair of differential capstans.

Other features and advantages of the present invention will become apparent to those skilled in the art from a reading of the following detailed description of an embodiment constructed in accordance therewith taken in conjunction with the accompanying drawings wherein:

DESCRIPTION OF THE PREFERRED EMBODIMENT

Figure 1:
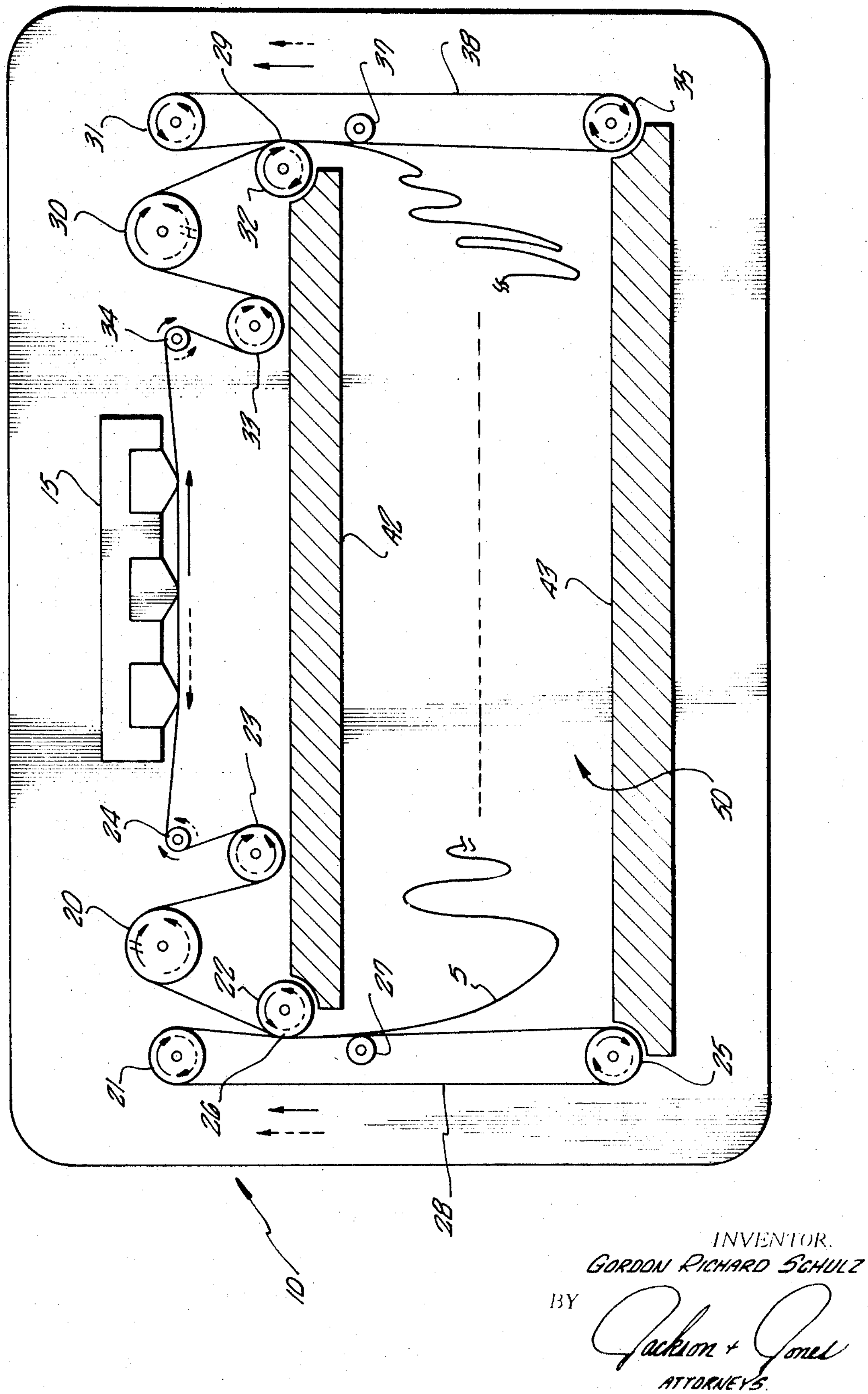
FIG. 1 is a plan view of a tape recorder having an endless tape storage bin and bidirectional drive capability in accordance with the principles of this invention.

Referring now to FIG. 1, a random bin tape recorder 10 includes an endless tape storage bin 50 which bin area is defined by bin walls 42 and 43 and the inner surfaces of endless belts 28 and 38. An endless tape 5 is threaded from bin 50 through an entrance or exit point 26, past a tape guide 20, drive capstan 23, tape guide 24, across transducers 15, past tape guide 34, drive capstan 33, tape guide 30, through entrance or exit point 29 to bin 50.

In order to achieve bidirectional tape movement, drive pucks 22 and 32 turn in the same direction irrespective of the direction of tape movement dictated by drive capstans 23 and 33. The direction is the direction tending to urge the tape into the bin. This provides the necessary tape-driving force to cause the tape to move into the bin in one tape movement direction and conversely the drive pucks will, when the tape moves in an opposite direction, tend to reject spurious loops that are drawn to the exit point.

The tape is held in frictional contact with drive pucks 22 and 32 by endless belts 28 and 38. Each endless belt is also driven in a single direction by belt drivers 21 and 31 irrespective of the direction of tape movement. The adjoining surface of each belt nearest its associated drive pucks also moves in the direction to cause tape 5 to have a tendency to move into the bin.

Figure 2:
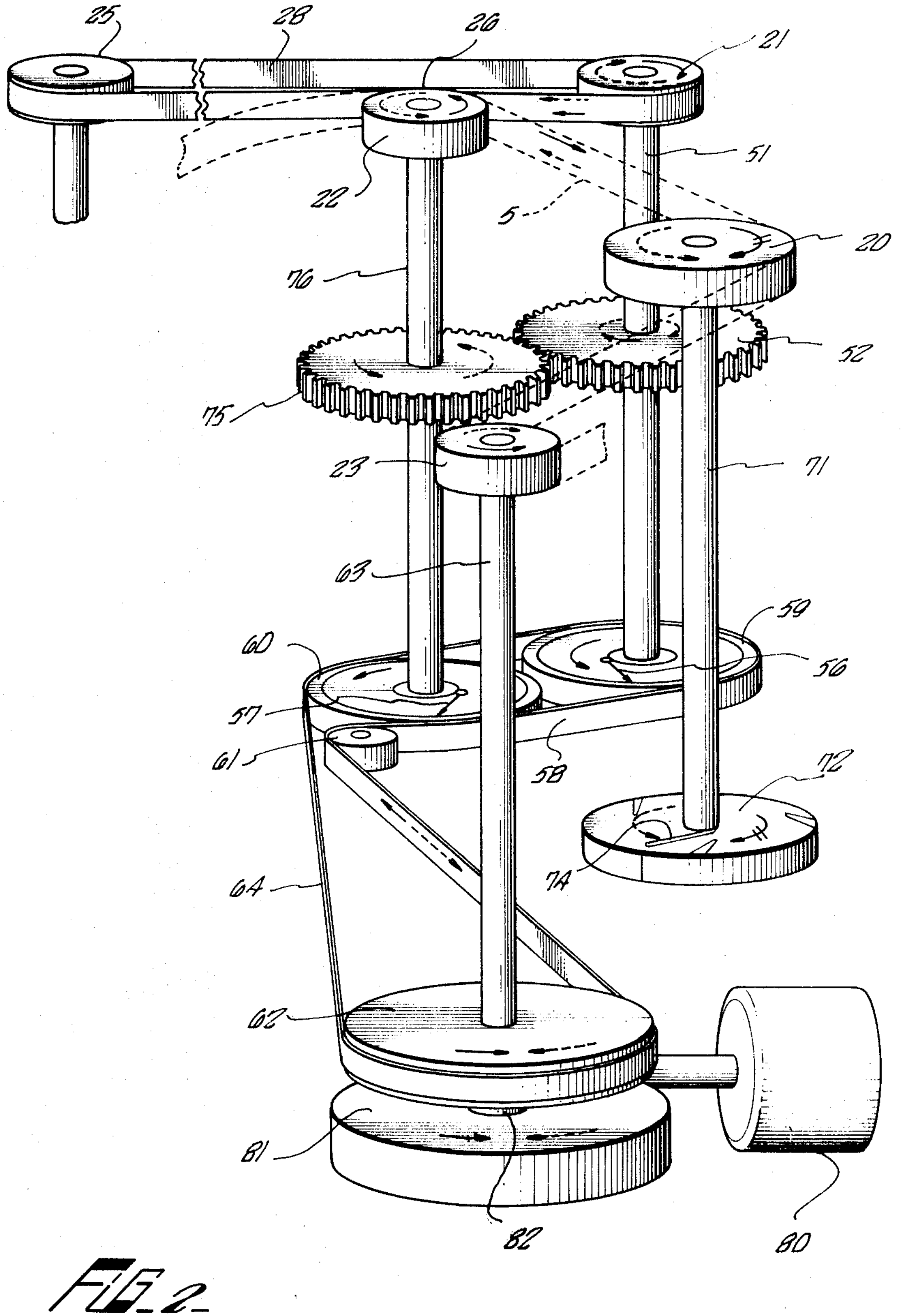
FIG. 2 is a perspective view of a suitable drive mechanism constructed in accordance with the principles of this invention.

Each endless belt drive puck pair moves at two preselected speeds depending upon whether they are operating as bin entrance or bin exit points. If they are operating as bin entrance points, their surfaces in contact with tape 5 are moving in the same direction as the tape. Therefore, their surface speeds are choosen to be slightly higher than the tape speed to provide positive feed input bin drive. When the endless belt drive puck combination are operating as bin exit points, that is when they are admitting tape 5 to the transducer portion of the recorder, their surfaces adjacent tape 5 are moving in a direction opposite to the direction of tape movement. Therefore, their surface speeds are preselected as a function of the tape speed and the frictional coefficients of the endless belt and drive puck materials. The resultant frictional forces provide the proper supply tension to the tape necessary to control tracking across the heads and provide takeup tension for capstan driving. Generally, the speed of the endless belt drive puck combination when operating in a bin output mode will be less than their operating speed when operating in the bin input mode. This is indicated in FIG. 2 by the relative lengths of the solid and dotted arrows associated with drive pulleys 21 and 31 and drive pucks 22 and 32. The longer arrows correlate with the bin output modes while the shorter arrows correlate with the bin input modes. Both clockwise and counterclockwise movement of endless tape 5 is illustrated.

The relative motion of each endless belt drive puck pair constitutes an important feature of the present invention. At the bin input location, the drive puck endless belt combination tends to drive the tape into the bin whereas in the bin output location, the drive puck endless belt combination tends to reject tape loops which otherwise would be drawn into the transducer feed portion of the recorder.

The operation of the tape system of my invention will now be described with reference to a clockwise movement of the endless tape 5. The operation of the various components in FIG. 1 for a clockwise movement of tape 5 is represented by solid arrows; conversely, component operation for counterclockwise movement of tape 5 is represented by broken arrows. The principle of operation is identical for both clockwise and counterclockwise movements of tape 5.

Endless belt 28, drive pulley 21, and drive puck 32, always rotate in a clockwise direction as shown irrespective of the direction of tape movement. Endless belt 38, drive puck 22 and drive pulley 31, always rotate in a counterclockwise direction irrespective of the direction of tape movement. For clockwise movement of tape 5, the tape leaves the bin at point 26 where it comes in frictional contact with drive puck 22 and endless belt 21 which produce a drag on the tape in a direction opposite to the direction of tape movement. The counterrotating directions of drive puck 22 and endless belt 28 serve to reject spurious loops, thereby reducing the loops to a single layer.

Tape 5 moves from point 26 to tape guide 20 which functions, for clockwise movement of tape 5, as a supply guide. In this mode its rotation is locked, as indicated by the hatchings on the solid arrow in FIG. 1. Locking tape guide 20 causes the tape to drag around its periphery. This drag generates added supply tape tension for the supply capstan 23. Tape 5 is driven by the wrap effect around capstan 23. The tape 5 is wrapped around capstan 23 by freewheeling tape guide 24. The tape thereafter passes across transducer assembly 15 and on around freewheeling tape guide 34 to capstan 33 to guide 30. For a clockwise movement of tape 5, guide 30 is functioning as a takeup guide, therefore guide 30 is permitted to rotate freely to allow maximum takeup tension. The tape next moves to bin entrance point 29 where the tape is clamped to puck 32 by belt 38. As previously mentioned, the surfaces of puck 32 and endless belt 38 are moving at a higher speed than the tape thereby insuring positive bin input tape drive.

It will be noted that tape guides 20 and 30 are placed immediately following the bin entrance and/or exit points 26 and 29. The guides serve a dual function. They have bidirectional clutches more particularly described later allowing them to rotate in one direction only. When the tape leaves the bin moving to a supply capstan, the associated guide is locked by the clutch. The guide now functions as a mechanical amplifier thereby providing added supply tension for the supply capstan. When the tape passes from the takeup capstan to the bin input point, the associated guide is allowed to rotate freely thereby allowing for bin input feeding.

Referring now to FIG. 2, one suitable endless belt and drive puck drive configuration is illustrated. The drive is shown for elements 20 to 23 in FIG. 1. It is to be understood that a similar drive would be utilized for elements 30 to 33. A bidirectional motor 80 drives a gear 81. Gear 81 has shafts 82 and 63 attached thereto. Attached to shaft 82 is a pulley 62. Drive capstan 23 is attached to shaft 63. For clockwise movement of tape 5, represented as in FIG. 1 by solid directional arrows, motor 80 rotates gear 81 and capstan 23 in a counterclockwise direction. Pulley 62 via pulley belt 64 causes pulleys 59 and 60 to also rotate in a counterclockwise direction. Bidirectional clutch 57 engages causing pulley 60 and shaft 76 to rotate in a counterclockwise direction. Gear 75 which is fixed to shaft 76 causes gear 52 and drive puck 51 to rotate in a clockwise direction. In this directional mode of tape movement, bidirectional clutch 56 is freewheeling.

When the capstan shaft 63 rotates in the opposite or clockwise direction, corresponding to counterclockwise movement of tape 5, the bidirectional clutches 56 and 57 will respectively alternate causing puck 22 and pulley 21 to continue to rotate in the same direction. Bidirectional clutch 74 serves to allow guide 20 to freely rotate when guide 20 operates in a bin input mode while preventing rotational movement when guide 20 operates in the capstan supply mode.

It is to be understood that the foregoing features and principles of this invention are merely descriptive and that departures and variations thereof are possible by those skilled in the art, without departing from the spirit and scope of this invention.

What I claim is:

1. In a magnetic tape recording apparatus for moving an endless loop tape across a transducer assembly, the combination which comprises:

an endless loop tape storage bin having at least one opening therein;

tape driving means for moving the tape from the storage bin through the opening past the transducer assembly; and guard means for preventing spurious loops of said tape from exiting the storage bin, said guard means including a first movable surface contacting one side of the tape at the opening and a second movable surface contacting the opposite side of the tape at the opening, said first movable surface moving in a direction substantially opposite to the direction of tape movement to urge spurious loops contacting said first movable surface away from the area of said opening, said second movable surface moving in a direction substantially opposite to the direction of the tape movement.

2. In a tape recording apparatus for moving an endless loop tape bidirectionally across a transducer assembly, the combination which comprises:

an endless loop random tape storage bin having a first and second opening therein;

tape driving means for bidirectionally moving the tape from the storage bin through one of said openings past the transducer assembly back into the storage bin through the other of said openings;

a first movable surface contacting a surface of the tape at said first opening and moving in a direction tending to urge the tape into the storage bin proximate said first opening irrespective of the direction of tape movement; and a second movable surface contacting a surface of the tape at said second opening and moving in a direction tending to urge the tape into the storage bin proximate said second opening irrespective of the direction of tape movement.

3. The combination of claim 2 further comprising:

third and fourth movable surfaces one each associated with said first and second movable surfaces, each of said third and fourth surfaces contacting the tape on the side opposite that contacted by its associated surface and moving in the same direction as its associated surface.

4. The combination of claim 3 wherein there are first and second rotatably mounted pucks, the peripheral surfaces of said pucks forming said first and second movable surfaces respectively.

5. The combination of claim 4 wherein there are first and second movable endless belts, the outer surfaces of said belts forming said third and fourth surfaces respectively.

6. The combination of claim 2 further comprising:

first and second rotatably mounted tape guides one each associated with said first and second openings, the tape being wrapped around a portion of the periphery of each tape guide; and means for preventing rotational motion of each of said tape guides when an associated opening is functioning as a bin output opening.

7. The combination of claim 5 wherein said tape-driving means includes first and second bidirectionally driven capstans, the tape being wrapped around a portion of the periphery of each capstan, the combination further comprising:

means for driving said capstan in a first and second direction; and means responsive to said capstan-driving means for driving said pucks and said endless belts in fixed directions.

8. The combination of claim 7 wherein the surfaces of the puck and endless belt associated with an input opening are driven past said input opening at a speed greater than the speed of the tape.

9. A method of bidirectionally driving tape from a random bin storage location through a first opening therein across a transducer assembly back into the storage location through a second opening therein comprising the steps of:

pulling the tape from the bin through one of said openings; and moving a pair of surfaces, each in frictional contact with a surface of the tape at said one opening, in a direction opposite to the direction of tape movement.